(12) United States Patent
Bahl

(10) Patent No.: US 6,519,004 B1
(45) Date of Patent: *Feb. 11, 2003

(54) METHOD FOR TRANSMITTING VIDEO INFORMATION OVER A COMMUNICATION CHANNEL

(75) Inventor: Paramvir Bahl, Issaquah, WA (US)

(73) Assignee: Microsoft Corporation, Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/169,120

(22) Filed: Oct. 9, 1998

(51) Int. Cl.[7] .................................................. H04N 7/12
(52) U.S. Cl. ................ 348/385.1; 370/468; 375/240.11
(58) Field of Search ........................... 348/384.1, 422.1, 348/414.1, 385.1, 387.1, 388.1, 390.1, 389.1, 404.1, 408.1, 423.1, 405, 498, 403; 382/239; 375/240.05, 240.11, 240.01; 370/468, 458; 710/107; H04N 7/12

(56) References Cited

U.S. PATENT DOCUMENTS

| | | | |
|---|---|---|---|
| 4,751,742 A | * | 6/1988 | Meeker ...................... 348/403 |
| 4,797,742 A | | 1/1989 | Sugiyama et al. |
| 4,821,119 A | | 4/1989 | Gharavi |
| 5,001,561 A | | 3/1991 | Haskell et al. |
| 5,109,528 A | | 4/1992 | Uddenfeldt |
| 5,115,309 A | * | 5/1992 | Hang .......................... 348/388 |
| 5,214,789 A | | 5/1993 | George |
| 5,216,503 A | * | 6/1993 | Paik et al. ............. 375/240.11 |
| 5,315,670 A | * | 5/1994 | Shapiro ....................... 382/240 |
| 5,412,741 A | * | 5/1995 | Shapiro ....................... 348/498 |
| 5,436,665 A | | 7/1995 | Ueno et al. |
| 5,455,629 A | | 10/1995 | Sun et al. |
| 5,513,379 A | | 4/1996 | Benveniste et al. |
| 5,526,052 A | | 6/1996 | Ar |
| 5,543,845 A | | 8/1996 | Asamura et al. |

(List continued on next page.)

OTHER PUBLICATIONS

Shen et al., "Compressed Image Error Concealment and Post–Processing for Digital Video Recording", IEEE Asia–Pacific Conf. On Circuits and Systems, pp. 636–641, Dec. 1994.

Ghanbari et al., "Cell–Loss Concealment in ATM Video Codecs", IEEE Transactions on Circuits and Systems for Video Technology, vol. 3, No. 3, Jun. 1993, pp. 238–247.

Zhang et al., "Variable Bit–Rate Video Transmission in the Broadband ISDN Environment", Proceedings of the IEEE, vol. 79, No. 2, Feb. 1991, p. 214–222.

Khansari et al., "Low Bit–Rate Video Transmission Over Fading Channels for Wireless Microcellular Systems", IEEE Trans. on Circuits and Systems for Video Tech., vol. 6, No. 1, Feb. 1996, pp. 1–11.

(List continued on next page.)

*Primary Examiner*—Gims S. Philippe
(74) *Attorney, Agent, or Firm*—Leydig, Voit & Mayer, Ltd.

(57) ABSTRACT

An adaptive region-based, multi-scale, motion compensated video compression algorithm design for transmission over hostile communication channels. The algorithm is embodied in a video encoder that extracts spatial information from video frames to create video regions that are then decomposed into sub-bands of different perceptual importance before being compressed and transmitted independently. The system further uses unequal error protection, prioritized transmission and reconstruction to guarantee a minimum spatial and temporal resolution at the receiver. In particular, the region segmented frames bound both spatial and temporal error propagation within frames. A connection-level inter-region statistical multiplexing scheme is also employed to ensure optimal utilization of reserved transmission bandwidth.

20 Claims, 14 Drawing Sheets

U.S. PATENT DOCUMENTS

| | | |
|---|---|---|
| 5,544,315 A | 8/1996 | Lehfeldt et al. |
| 5,572,221 A | 11/1996 | Marlevi et al. |
| 5,621,467 A | 4/1997 | Chien et al. |
| 5,625,713 A | 4/1997 | Allen et al. |
| 5,629,780 A | 5/1997 | Watson |
| 5,675,384 A * | 10/1997 | Ramamurthy et al. ...... 348/405 |
| 5,745,642 A | 4/1998 | Ahn |
| 5,764,805 A | 6/1998 | Martucci et al. |
| 5,771,358 A * | 6/1998 | LaBerge ...................... 710/107 |
| 5,812,547 A | 9/1998 | Benzimra et al. |
| RE35,916 E | 10/1998 | Dennison et al. |
| 5,825,759 A | 10/1998 | Liu |
| 5,877,812 A * | 3/1999 | Krause et al. .............. 348/385 |
| 5,896,176 A | 4/1999 | Das et al. |
| 5,926,476 A | 7/1999 | Ghaibeh |
| 5,936,674 A | 8/1999 | Kim |
| 5,943,347 A | 8/1999 | Shepard |
| 5,953,344 A | 9/1999 | Dail et al. |
| 5,990,933 A | 11/1999 | Ozone et al. |
| 5,995,668 A | 11/1999 | Corset et al. |
| 6,002,802 A | 12/1999 | Chujioh et al. |
| 6,011,587 A | 1/2000 | Sakazawa et al. |
| 6,020,931 A | 2/2000 | Bilbrey et al. |
| 6,035,073 A | 3/2000 | Kaup |
| 6,052,598 A | 4/2000 | Rudrapatna et al. |
| 6,055,339 A | 4/2000 | Wilkinson |
| 6,078,616 A | 6/2000 | Ozcelik et al. |
| 6,111,916 A | 8/2000 | Talluri et al. |
| 6,125,278 A | 9/2000 | Wieczorek et al. |
| 6,141,453 A | 10/2000 | Banham et al. |
| 6,141,486 A | 10/2000 | Lane et al. |
| 6,167,084 A * | 12/2000 | Wang et al. ........... 375/240.02 |
| 6,188,905 B1 | 2/2001 | Rudrapatna et al. |
| 6,240,076 B1 | 5/2001 | Kanerva et al. |
| 6,240,079 B1 | 5/2001 | Hämäläinen et al. |

OTHER PUBLICATIONS

Podolsky et al., Limited Retransmission of Real–Time Layered Multimedia Signal Processing, pp. 591–596, Dec. 1998.

Molloy et al., "A Video Codec Chipset for Wireless Multimedia Networking", IEEE Sign. Proc. Society Workshop on VLSI Signal Processing, pp. 381–390, Sep. 16–18, 1995.

McCanne et al., "Joint Source/Channel Coding for Multicast Packet Video", Proc. International Conf. On Image Processing, vol. 1, pp. 25–28, Oct. 23–26, 1995.

Sanneck et al., "A New Technique for Audio Packet Loss Concealment", Global Telemcommunications Conference, GLOBECOM '96, pp. 48–52, May 1996.

Mallat, S., "Wavelets for Vision", Proceedings of the IEEE, vol. 84, No. 4, Apr. 1996.

Bahl, P., "Supporting Digital Video in a Managed Wireless Network", IEEE Communications Magazine, vol. 36, Issue 6, pp. 94–102, Jun. 1998.

Bahl et al., "Optimizing Resource Utilization in a Wireless Multimedia Network", IEEE Inter. Conf. On Communications, ICC '97, vol. 3, pp. 1432–1437, Jun. 8–12, 1997.

Bahl et al., "H.263 based Video Codec for Real–time Visual Communications Over Wireless Radio Networks", IEEE $6^{th}$ Int. Conf. On Universal Personal Comm., vol. 2, pp. 773–779, Oct. 12–16, 1997.

Ramchandran et al., "Wavelets, Subband Coding, and Best Bases", Proceedings of the IEEE, vol. 84, No. 4, pp. 541–560, Apr. 1996.

* cited by examiner

Frame Difference between
the 9th and 10th Frame

Threshold = 20

Original (16Kbit/sec)

Without Segmentation

With Spatial Segmentation

With Spatial and Frequency
Segmentation

METHOD FOR TRANSMITTING VIDEO INFORMATION OVER A COMMUNICATION CHANNEL

FIELD OF THE INVENTION

This invention relates generally to communication networks and, more particularly, relates to a video encoder for generating information representative of a video frame, a method for transmitting the generated information over a communication channel, and a method for reconstructing the video image from the generated information.

BACKGROUND OF THE INVENTION

Video communications over a communication network are currently being carried out using source encoders and channel encoders that were designed independently of each other. The tradition of separating the source and channel encoding tasks arises from the theoretical foundation of Sharon's separation principle of source and channel encoding that espouses the notion that this separation is optimal. According to this principle, the task of the source encoder is to do the best job it can in compressing the input signal so that the compressed bit rate will match the available bit rate of the communication channel.

Sharon's separation principal does, however, fail to address the error characteristics of the communication channel on which the video information will traverse. Importantly, developing an encoder without regard to these error characteristics has lead to the result that the image signal is rendered effectively useless if even a few bits are corrupted during transmission. This problem becomes especially pronounced in a wireless communication network where large variations and unpredictability in the error characteristics abound. Unfortunately, currently utilized video coding standards including H.261, MPEG-1, MPEG-2 and H.263, which were developed without regard to the error characteristics of the communication channel, fail to provide the error resiliency needed to minimize this problem.

Furthermore, currently utilized error protection and error recovery schemes that are employed to alleviate the noted error-induction problem have the undesirable side effect of wasting bandwidth within the communication channel. For example, a commensurate amount of bandwidth must be allocated to video transmissions at the expense of other transmissions when additional error checking bits are added to the video bit-stream. Furthermore, using an automatic repeat request (ARQ) procedure that functions to initiate the re-transmission of those transmissions deemed to be in error, while providing error recovery, adds both delay and bandwidth overhead to the transmissions. Delay for the case of interactive real-time video applications causes unacceptable application performance, while bandwidth overhead reduces the efficiency of the overall system.

From the foregoing, it is evident that a need exists for software and hardware mechanisms that ensure timely and robust delivery of video data over bandwidth-limited, error-prone communication channels.

SUMMARY OF THE INVENTION

In accordance with this need, the subject invention may be generally described as a combined application and network level solution for achieving robust video transmission over bandwidth-limited and error-prone communication channels. More specifically, the desired video transmission is achieved through the use of a method for generating information indicative of a video frame, a method for transmitting the generated information over the communication channel, and a method for reconstructing the video information from the generated information.

For generating the information indicative of a video frame, the video frame is segmented into a plurality of discrete spatial components and each of the plurality of discrete spatial components is transformed into a plurality of discrete frequency components. For transmitting the generated information over the communication channel, the video components are evaluated to determine the peak number of bits required for their transmission, bandwidth is requested as a function of this determination, the most important video components are first transmitted in the requested bandwidth and any remaining bandwidth is used to transmit any remaining video components. For reconstructing the video information from the generated information the video components received are checked for transmission errors and, if any such errors are present, video components from a previous transmission are substituted therefor. In this manner, the invention overcomes the noted deficiencies in the prior art by, among other things, reducing the reliance on error correction and error recovery schemes that are traditionally used in transmission over error-prone channels and preventing bandwidth wastage though intelligent bandwidth reservation and utilization while guaranteeing the promised spatial and temporal video resolution at the receiver.

A better understanding of the objects, advantages, features, properties and relationships of the invention will be obtained from the following detailed description and accompanying drawings which set forth an illustrative embodiment which is indicative of the various ways in which the principles of the invention may be employed.

BRIEF DESCRIPTION OF THE DRAWINGS

For a better understanding of the invention, reference may be had to a preferred embodiment shown in the accompanying drawings in which.

DETAILED DESCRIPTION OF THE INVENTION

Figure 1:
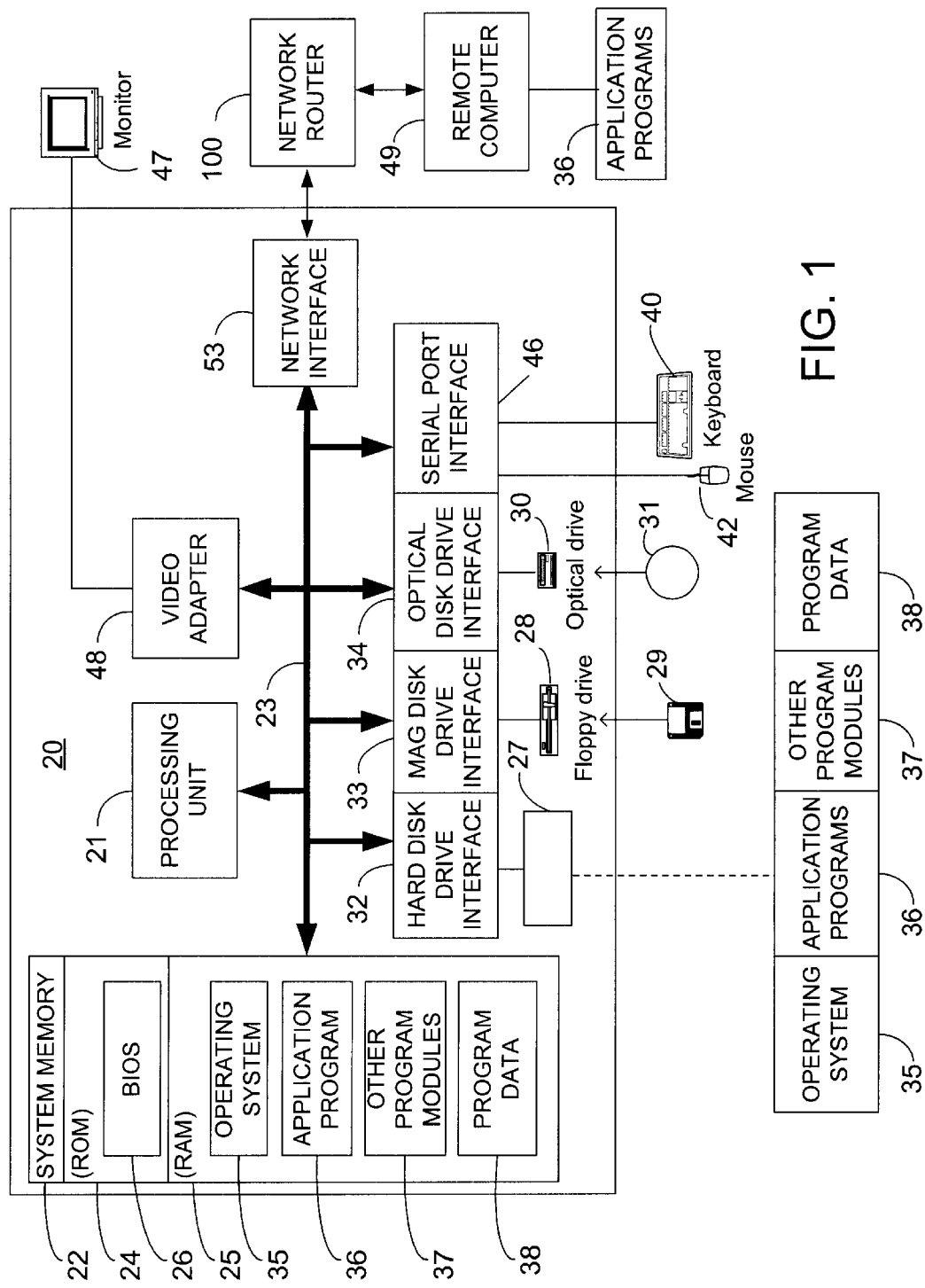
FIG. 1 illustrates a block diagram of an exemplary communication network in which the subject invention may reside.

Turning to the drawings, wherein like reference numerals refer to like elements, the invention is illustrated as being implemented in a suitable network environment. Although not required, the invention will be described in the general context of computer-executable instructions, such as program modules, being executed by a processing device such as a personal computer, mainframe computer, or the like. Generally, program modules include routines, programs, objects, components, data structures, etc. that perform particular tasks or implement particular abstract data types. Moreover, those skilled in the art will appreciate that the invention may be practiced with other processing devices such as consumer electronic devices having one or more processors such as, for example, mobile telephones. The invention may also be practiced in distributed computing environments where tasks are performed by remote processing devices that are linked through a communication network and where program modules are located in both local and remote memory storage devices.

With reference to FIG. 1, an exemplary network system in which the invention may reside is illustrated. The network system includes a communication source 20 illustrated in the exemplary form of a personal computer. The communication source 20 includes a processing unit 21, a system memory 22, and a system bus 23. The system bus 23 functions to couple the various system components including the system memory 22 to the processing unit 21. The system bus 23 may be any of several types of bus structures including a memory bus or memory controller, a peripheral bus, and a local bus using any of a variety of bus architectures. The system memory 22 includes read only memory (ROM) 24 and random access memory (RAM) 25. A basic input/output system (BIOS) 26, containing the basic routines that help to transfer information between elements within the communication source 20, such as during start-up, is stored in ROM 24. The communication source 20 may also include a hard disk drive 27, a magnetic disk drive 28, or an optical disk drive 30. It will be appreciated that these devices respectively allow for reading from and writing to a hard disk, reading from or writing to a removable magnetic disk 29 and for reading from or writing to a removable optical disk 31, such as a CD ROM or other optical media.

When incorporated into the communication source 20, the hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the communication source 20. It will be appreciated by those skilled in the art that other types of computer readable media that can store data may also be used. Examples of such media devices include, but are not limited to, magnetic cassettes, flash memory cards, digital videodisks, Bernoulli cartridges, random access memories, and read only memories.

A number of program modules may be stored in one or more of the memory devices and typically include an operating system 35, one or more applications programs 36, other program modules 37, and program data 38. A user may enter commands and information into the communication source 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor 47, the communication source 20 may also include other peripheral output devices, not shown, such as speakers and printers.

The communication source 20 operates in a networked environment using logical connections to one or more remote communication receivers 49, also illustrated in the exemplary form of a personal computer. The connection is typically made through a further processing device 100 that is responsible for network routing. In the illustrated embodiment, the remote communication receiver 49 will include many or all of the elements described above relative to the communication source 20 including the memory storage devices and monitor 47. Furthermore, within such a networked environment, it will be appreciated that program modules depicted relative to the communication source 20, or portions thereof, may be stored in the memory storage devices of the remote communication receiver 49.

The description that follows will refer to acts and symbolic representations of operations that are performed by the processing devices 20, 49, 100 unless indicated otherwise. As such, it will be understood that such acts and operations, which are at times referred to as being computer-executed, include the manipulation by the CPUs of the devices of electrical signals representing data in a structured form. This manipulation transforms the data or maintains it at locations in the memory system, which reconfigures or otherwise alters the operation of the processing devices 20, 49, 100 in a manner well understood by those of skill in the art of computer systems. The data structures where data is maintained are physical locations of the memory that have particular properties defined by the format of the data. While the invention is being described in the foregoing context, it is not meant to be limiting as those skilled in the art will further appreciate that various of the acts and operation described herein may also be implemented in hardware.

Figure 2:
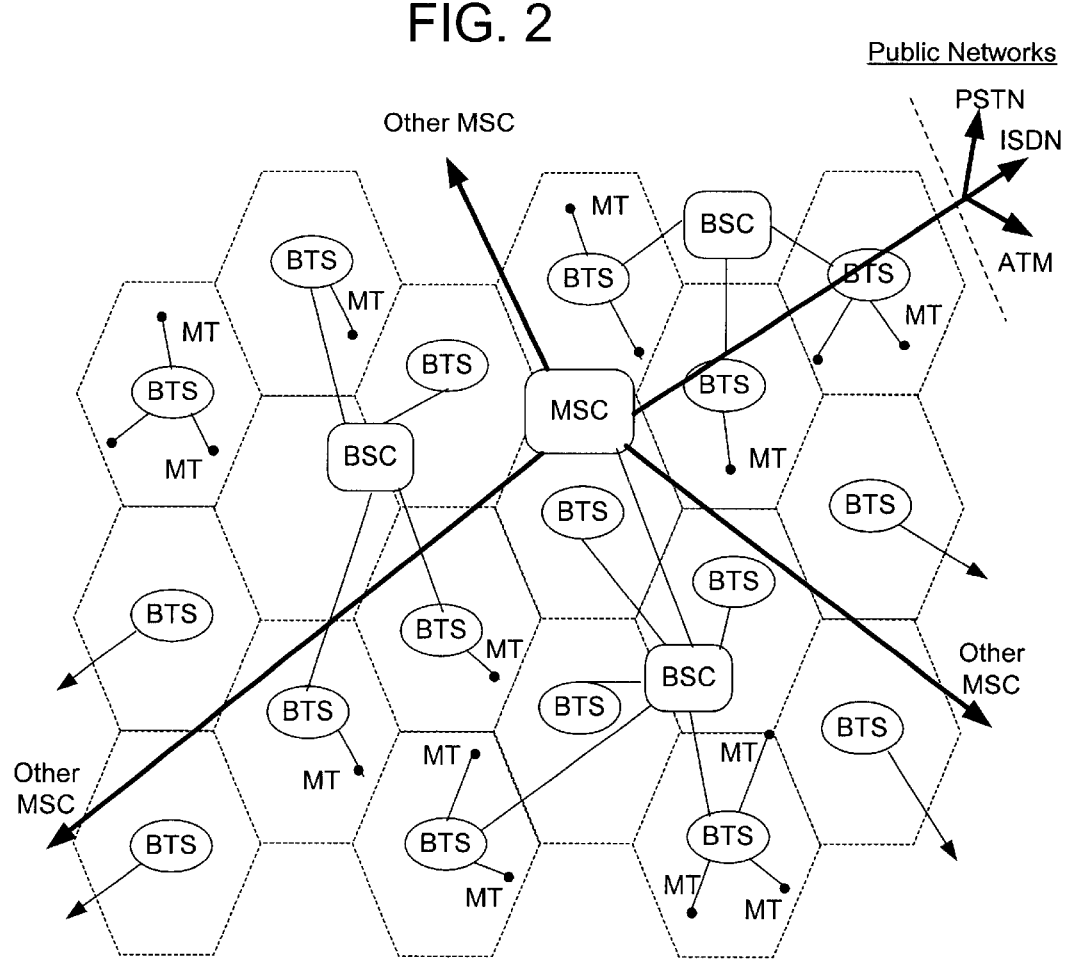
FIG. 2 illustrates the exemplary network of FIG. 1 in the form of a cellular communication network.

In a preferred embodiment, the network environment comprises a wireless, cellular communication network such as depicted in FIG. 2. Nevertheless, while the invention will be described hereinafter in that context, those of skill in the art will appreciate how to adapt the features of the subject invention for use in other communication networks such as a local area network (LAN) or a wide area network (WAN). Accordingly, the description that follows is not intended to be limiting.

Turning to FIG. 2, a cellular communication network having architecture that is similar to the architecture that is found in a Global System for Mobility (GSM) network is illustrated. As will be well understood by those of skill in the art, mobile terminals MT communicate over a radio channel with a network router in the form of a base transceiver station BTS that is located within the same cell. The base transceiver stations BTSs of neighboring cells communicate over high speed wired or wireless channels, with a base station controller BSC that serves as their manager. In turn, the base station controllers BSCs in a geographic region communicate over high speed wired or wireless channels with a mobile switching center MSC that serves as their manager. The mobile switching centers MSCs are connected to a public network that may include public switched telephone networks PSTNs, integrated services device networks ISDNs, or asynchronous transport mode ATM networks.

More specifically, the mobile terminals MT within the network are envisioned to be communication sources 20 of the following types: 1) communication sources 20VO performing voice packet transmissions; 2) communication sources 20DA performing data packet transmissions; and 3) communication sources 20VI performing video packet transmission. Meanwhile, linked to the public network as a destination for the transmissions originating from the mobile terminals MT are remote communication receivers 49 of the following type: 1) remote communication receivers 49VO receiving voice transmissions; 2) remote communication receivers 49DA receiving data transmissions; and 3) remote communication receivers 49VI receiving video transmissions. It will be appreciated by those skilled in the art that the remote communication receivers 49 may themselves be mobile.

Figure 3:
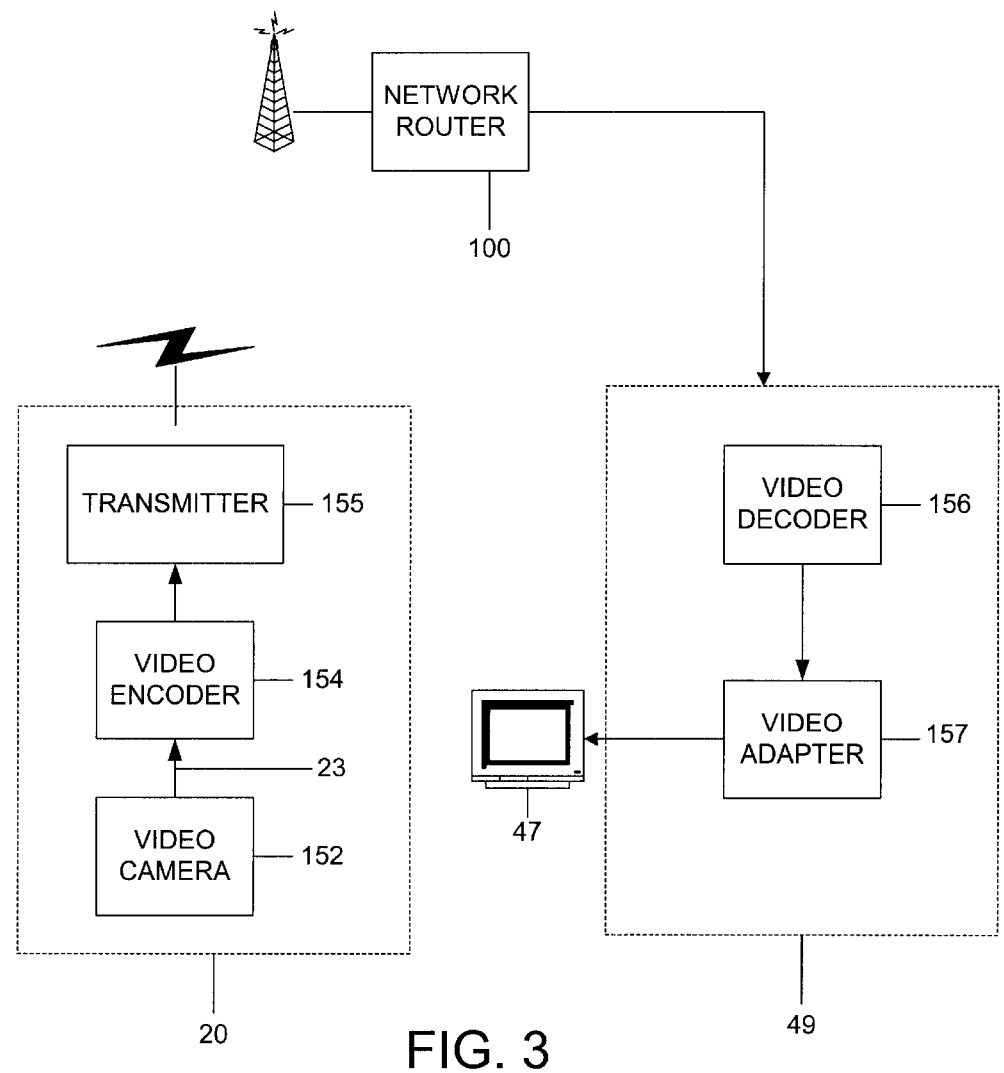
FIG. 3 illustrates a further block diagram of a communication source, network router, and communication receiver that reside in the communication network of FIGS. 1 and 2.

In accordance with one important aspect of the invention, the communication network provides for the efficient transmission of video communications from the communication sources 20VI to one or more associated remote communication receivers 49VI for subsequent display to remote users. For this purpose, as illustrated in FIG. 3, the communication sources 20VI are each provided with a video camera 152 that functions to capture video images as a series of digital video frames. Within the communication sources 20VI, the video camera 152 is connected to a video encoder 154 via the system bus 23. The video encoder 154 functions to generate information that is representative of the video frame which is subsequently supplied to a transmitter 155 for broadcasting over the communication channel to the network router 100, e.g., base station BS. Meanwhile, the remote communication receivers 49VI each include a video decoder 156 that functions to recreate the video frame from the information received over the communication network. The decoded video frame may then be forwarded to an associated monitor 47 for viewing through the use of an appropriate video adapter 157. For a description of the communications protocol that is preferably used in broadcasting the video information over the communication network the reader is referred to commonly owned, co-pending U.S. patent application No. 09/169,418 entitled Channel Access Scheme For Use In Network Communications that is incorporated herein by reference in its entirety.

Figure 4:
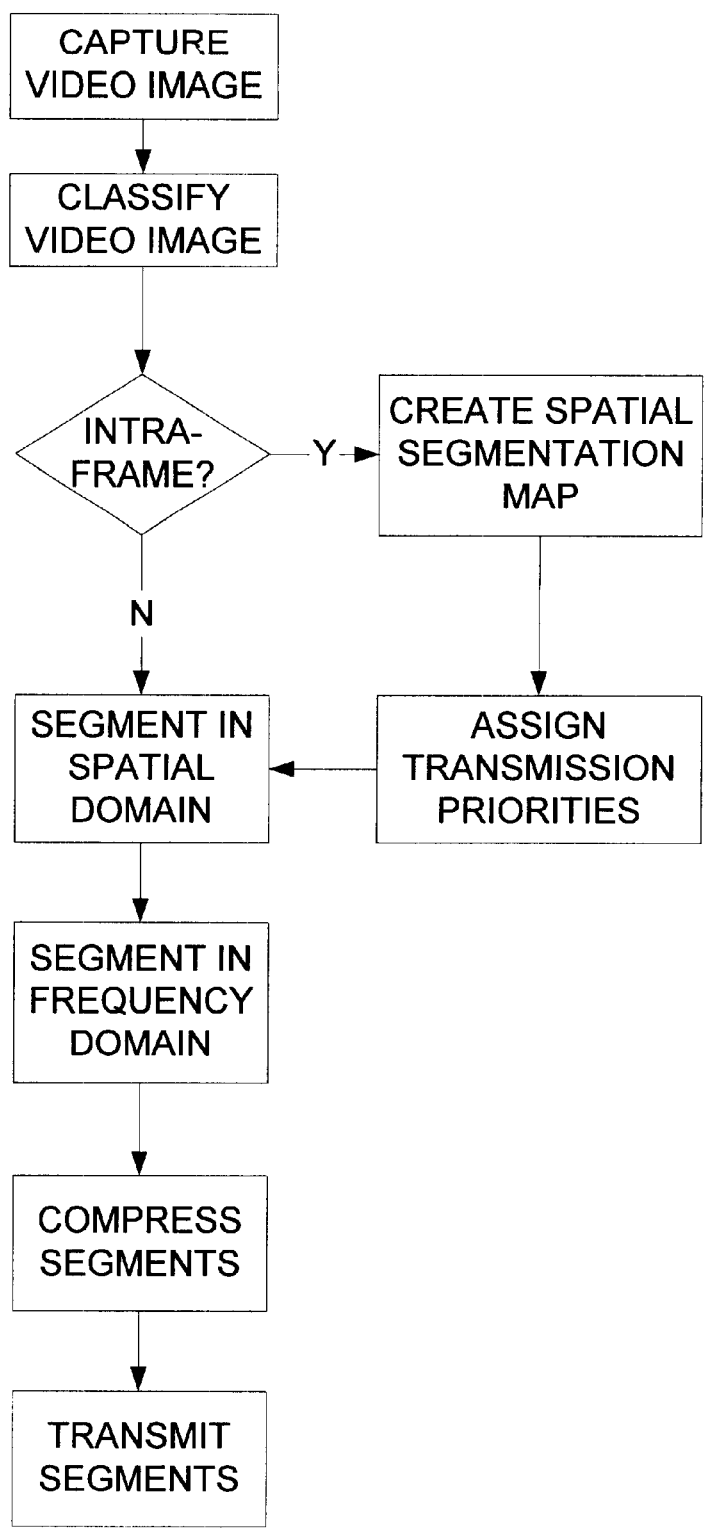
FIG. 4 illustrates a flow chart diagram depicting a method for generating information indicative of a video frame performed in accordance with an embodiment of the subject invention.
Figure 5:
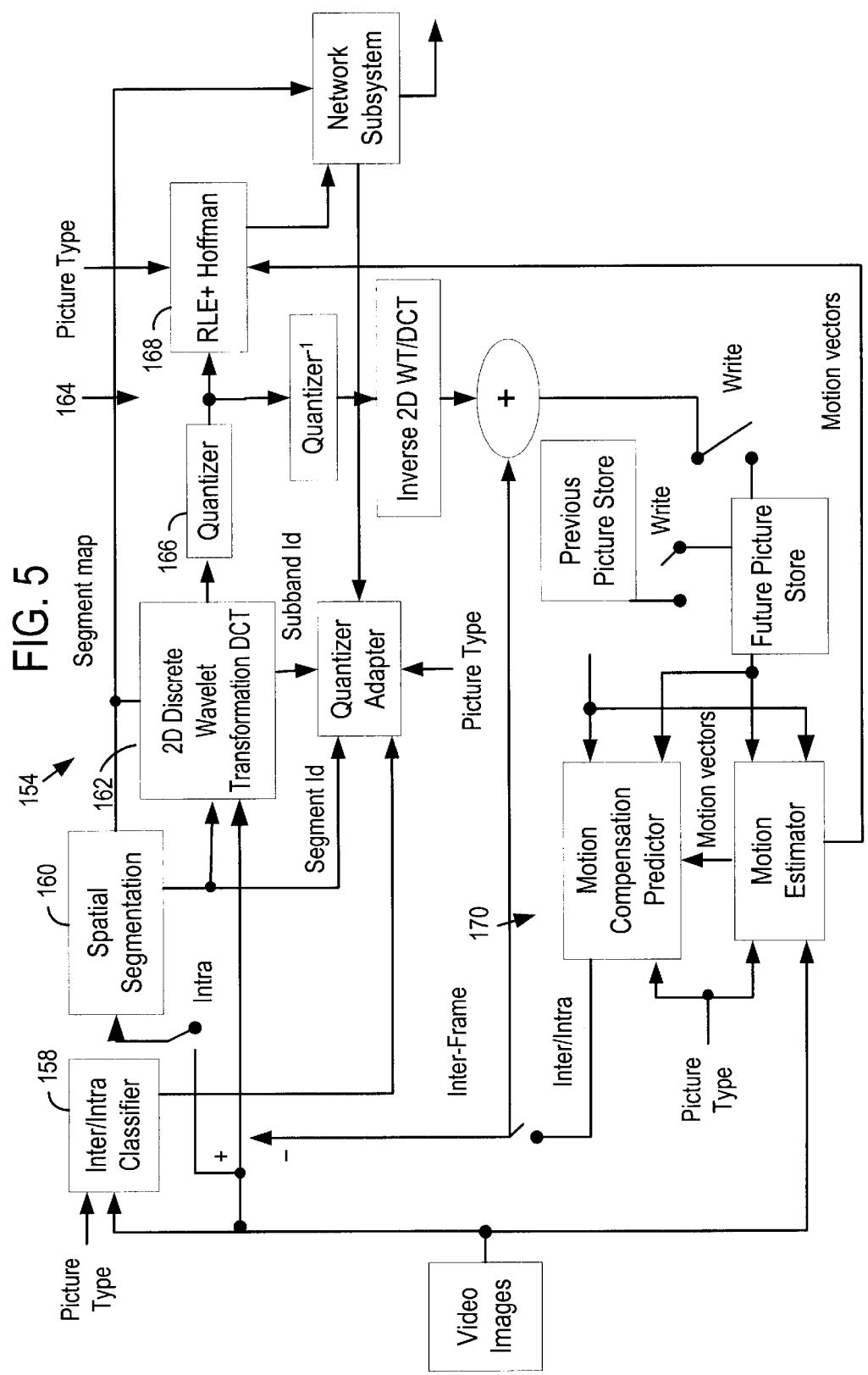
FIG. 5 illustrates a block diagram of an embodiment of a video encoder that functions to perform the method illustrated in FIG. 4.

Turning to FIGS. 4 and 5, the video encoder 154 functions to generate information representative of a video frame for use in providing visual communications over a communication network. Generally, the video encoding algorithm utilized within the encoder 154 generates the information by decomposing individual frames of a video sequence into a plurality of discrete, generally homogeneous video regions by performing segmentation in both the spatial and frequency domains. For this purpose, the encoder includes a spatial segmenter 160 and a frequency segmenter 162. Additionally, the video encoder 154 includes a frame classifier 158 and a compressor 164 comprised of a quantizer 166 and run length encoder 168. With the exception of the spatial segmenter 160 and the frequency segmenter 162, the components of the encoder 154 are similar to those found within an encoder that currently utilizes the MPEG-1 coding standard.

The frame classifier 158 is provided to classify the image frames, or segments thereof, as either an inter-frame (when it is to be coded with respect to other frames or segments) or an intra-frame (when it is to be coded independently). This classification is typically based on the order and motion activity of the video frame. For example, the first video frame or anchor frame of the video sequence or frames containing drastic scene changes are intra-coded while the remaining frame are inter-coded. Additionally, every $n^{th}$ video frame may be encoded as an intra-frame, where n is some predetermined number, in order to minimize inter-frame error propagation that may arise from time to time.

The spatial segmenter 160 is provided to create a spatial segmentation map for the video frame. Generally, for intra-frames, the entire image is segmented and a segmentation map is derived, for inter-frames, segmenting is employed and a segmentation map is derived only when there is significant motion activity within the video frame sequence. When the motion activity is below a predetermined threshold (a design variable), the previous most recently derived segmentation map is reused. When the motion activity is above the threshold, a new segmentation map is derived and forwarded to the remote computer 40, typically with the encoded frame information in a transmission packet. As will be better understood from the description that follows, the communication receiver 49VI requires the segmentation map in order to recreate the video images for display. An advantage to bosing the segmentation decision on motion activity is found in the significant reduction in overhead owing to the fact that a new segmentation map does not have to be forwarded to the communication receiver 49VI with every frame. Accordingly, the encoder and the decoder are designed to continue to use the same segmentation map until some significant scene change appears in the incoming frame at which time a new segmentation map is generated from the statistics of that frame.

Figure 6:
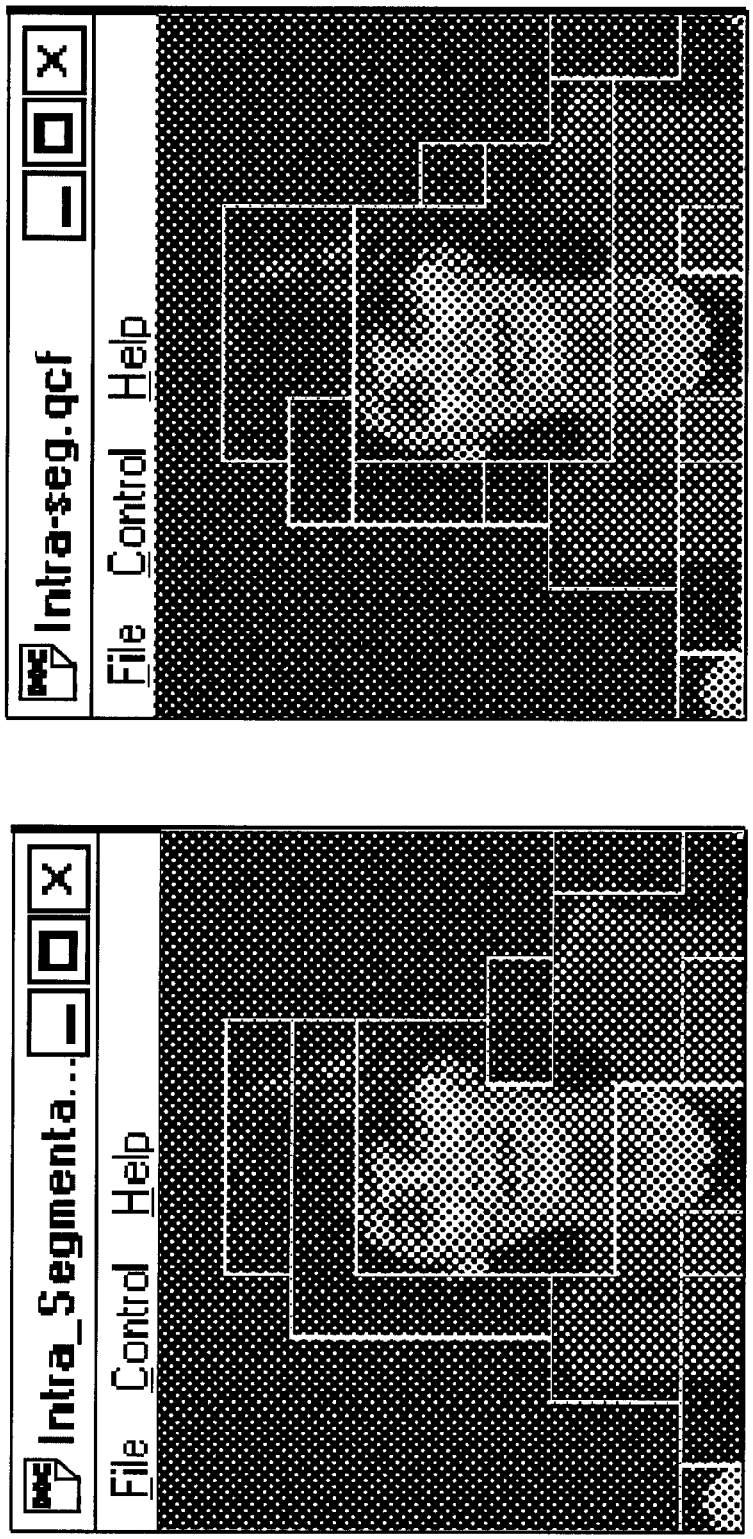
FIG. 6 illustrates two pictures of a video frame that has been spatially segmented in accordance with the method illustrated in FIG. 4.

To dynamically generate the segmentation map for those image frames that are independently coded, i.e., intra-frames, the spatial segmenter 160 first preferably partitions the digital image frame into blocks of size 16×16 pixels. For each block the variance of pixel intensity is then calculated. Adjacent blocks of similar variances that are within a predetermined threshold are then merged. The merged blocks form the spatial segmentation map examples of which are illustrated in FIG. 6.

Specifically, the blocks are merged when the following criterion is satisfied:

$$|\log(\sigma_i^2/\sigma_j^2)|<T \tag{1}$$

wherein $\sigma_i^2$ and $\sigma_j^2$ are the variances of two adjacent blocks i and j in a video frame that is being segmented and T is a threshold value for controlling the decomposition of the image frame. In particular, T may be defined by the following equation $$T=\log(\sigma_{max}^2/(\sigma_{min}^2)/N. \qquad (2)$$

wherein $\sigma_{max}^2$ and $\sigma_{min}^2$ are the maximum and minimum value, respectively, of the variances of all of the blocks within the image frame and N is the total number of blocks within the image frame. In a further embodiment of the invention, the value of the threshold T is additionally biased upward for the purpose of more clearly separating video objects from the background. Accordingly, T may be defined by the following equation $$T=\log(\sigma_{max}^2/\sigma_{min}^2)/N+\eta \qquad (3)$$

wherein $\eta$ is the mean value of the pixel intensity of all of the blocks in the video frame.

At this time, it is noted that there exists a trade-off between complexity and coding performance when choosing the block size. While using smaller sized blocks achieves relatively better spatial decomposition, the overhead incurred for sending the segmentation map to the decoder is relatively higher. For this reason, the block size of 16×16 was selected as it was seen to yield relatively good adaptability with acceptable levels of overhead for each intra-frame image.

Figure 7:
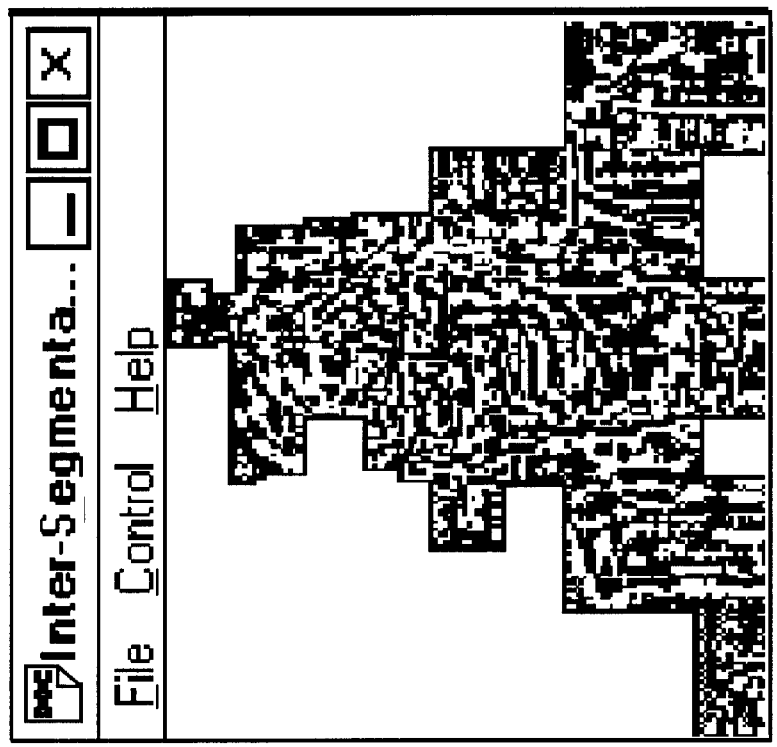
FIG. 7 illustrates two pictures of a video frame for the purpose of demonstrating the before and after effects of performing a threshold-based spatial segmentation on the difference image obtained by subtracting two successive video frames as done in the motion estimation and compensation component of the subject invention.
Figure 7:
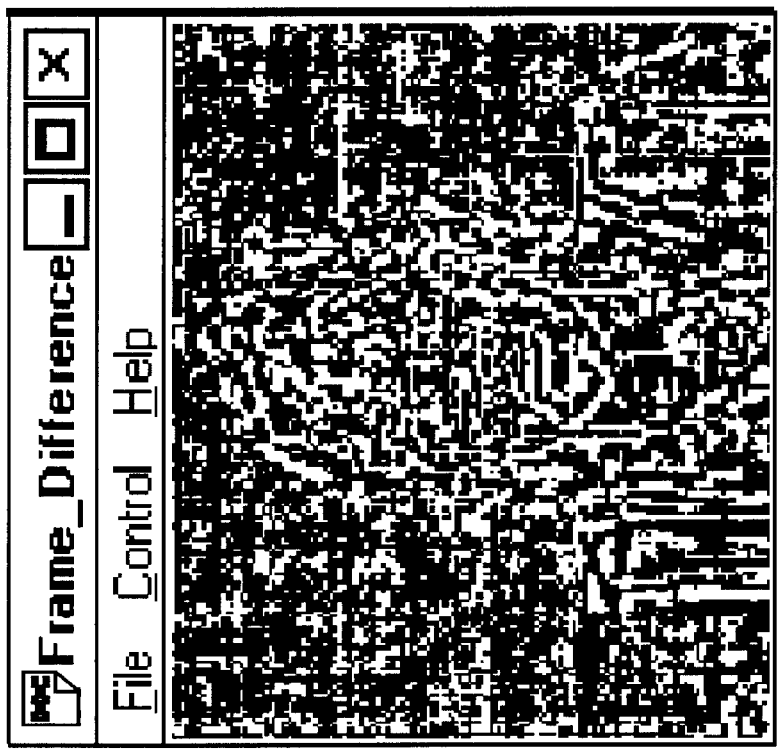

As described, for inter-frames, segmentation is employed only when there is significant motion activity within the video frame sequence. For this purpose, the video encoder 154 further includes a motion estimator/compensator 170 that functions to determine motion differences between two sequential image frames. To perform this task, the estimator/compensator 170 segments the image frame into 16×16 blocks and utilizes a matching algorithm to obtain motion vectors. The matching algorithm is employed to see if any of the blocks within the current image frame is sufficiently similar to a block within the previous image frame. During this search, it is preferred that the absolute error for each pixel as well as for each block be calculated to determine if the blocks are similar within a predetermined threshold. Exemplary results achieved as a result of performing these steps may be seen in FIG. 7.

If the motion difference between the two images is sufficient, the affected blocks are preferably classified as intra-frame blocks and a new segmentation map for these blocks is generated using the spatial segmenter 160 and the related methodology described previously. The motion difference between the images is typically deemed to be sufficient if: 1) any blocks have moved greater than a predetermined distance within the images; or 2) any blocks are determined to have no general match with any block in the previous image frame. The latter condition is utilized for the reason that it signifies that a new action object has likely entered the video sequence. In a further embodiment, it is preferred to reclassify a video frame as an intra-frame when the motion difference, i.e., the number of affected blocks, is above some maximum value. In this case, a completely new segmentation map for the entire frame would be generated using the spatial segmenter 160.

In yet another embodiment of the invention, the spatial segmenter 160 uses a predefined segmentation map to merge the blocks without regard to the intra-frame or inter-frame considerations set forth above. This predefined segmentation map is preferably arranged such that segments overlaying regions of less visual importance within the video frame sequence, such as background, contain a large number of merged blocks while segments overlaying areas of more visual importance, such as action objects, contain fewer merged blocks. Accordingly, it will be appreciated that the type of video to be transmitted should dictate the form of the predetermined segmentation map that is utilized. As will be appreciated, this method for segmenting the video frame has the advantage of requiring a lesser amount of computational energy when compared to the dynamic segmentation method described previously. As a result, the use of a static segmentation map has the advantage of providing a means for conserving power within the communication source 20VI. In addition, this method also has the advantage of providing a means to conserve bandwidth as the segmentation map needs to be transmitted to the communication receivers 49VI only one time owing to its static nature.

When establishing a segmentation map, it is also preferred that the spatial segments be provided with a transmission priority. This transmission priority is preferably established as a function of the information contained within the various segments. For example, larger segments that would typically contain background information would be given a lower transmission priority while smaller segments that would typically contain action information would be given a higher transmission priority.

Figure 8:
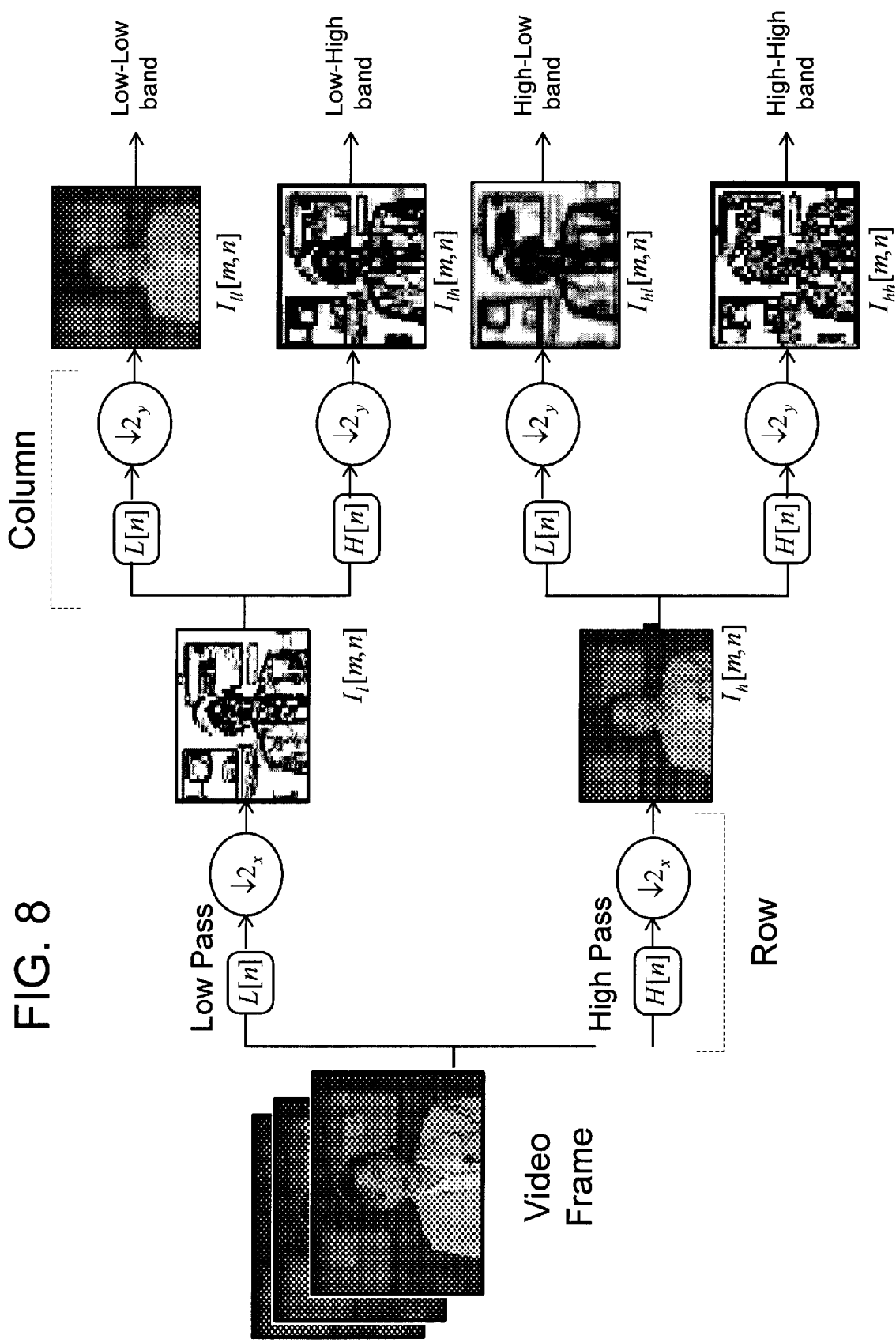
FIG. 8 illustrates the steps and corresponding results when segmenting a video frame in the frequency domain in accordance with the method illustrated in FIG. 4.

Once the image frame has been spatially segmented, each of the spatial segments is further decomposed into a plurality of discrete frequency components as illustrated in FIG. 8. For this purpose, the frequency segmenter 162 preferably utilizes a known wavelet-based technique that functions to represent an image signal at different levels of resolution. Generally, wavelets, when used in sub-band coding, emphasize both spatial localization and frequency localization during the band splitting procedure. In this manner, wavelet transformation provides for multi-resolution decomposition of the image frame. The image frame is thus represented by compact, non-redundant and exact representations at different scales.

More specifically, the frequency segmenter 162 is preferably embodied in a two-tap Harr filter that functions to decompose the luminance (Y) components of each segment into four bands, namely, one DC-subband (low-low band) and three AC-subbands (low-high, high-low, and high-high bands). The Haar filter was choosen because of its low computational cost and capability to decompose the arbitrarily shaped regions generated by the spatial segmenter 160 without causing any undesirable boundary effects. Following the wavelet decomposition, the frequency segmenter 162 also preferably applies an 8×8 Discrete Cosine Transform (DCT) in a moving window to each of the subbands. The DCT functions to further decorrelate the spectral components and causes energy compaction in coefficients. However, the DCT transformation step can be skipped if a more elaborate wavelet transformation is used such as a Daubechies 6-tap filter.

As described, the compressor applying the Harr transformation followed by the DCT to the image frame segments de-correlates the signals of the original image and concentrates the image information into a relatively small number of coefficients. Since most images consist primarily of smooth or low frequency components, it is often true that the DC-subband contains most of the energy of the image. As the DC-subband provides a smoothed and downsampled version of the original image while the AC-subbands provide information of edges and textures, the DC-subbands of each of the spatial segments should be given a still higher priority for transmission than should be given to the AC-subbands.

For the purpose of conserving communication channel bandwidth, information that comprises each of the subbands for each of the segments is preferably further compressed before it is transmitted over the communications network. Accordingly, a compressor 164 in the form of a quantizer 166 and standard run length encoder 168 is provided. Preferably, the quantizer 166 maximizes this compression by eliminating all but a few coefficients which still allows a good quality image to be reconstructed. This is possible owing to the above-noted observation that most of the image may be found within the DC-subband. More specifically, the quantizer 166 attempts to maximize compression by eliminating those coefficients below a user specified threshold and by applying a different quantizer to each segment as a function of its priority. Within these regions, the coefficients of the DC-subband are further quantized with a lower step size than are the AC-subbands. In this manner, the more important information of the image is preserved. In particular, in order to preserve the visual quality of an intra-frame, all coefficients of the lowest frequency subbands are preferred to be protected for all video regions. For inter-frame, it is preferred that all motion information be protected.

Figure 9:
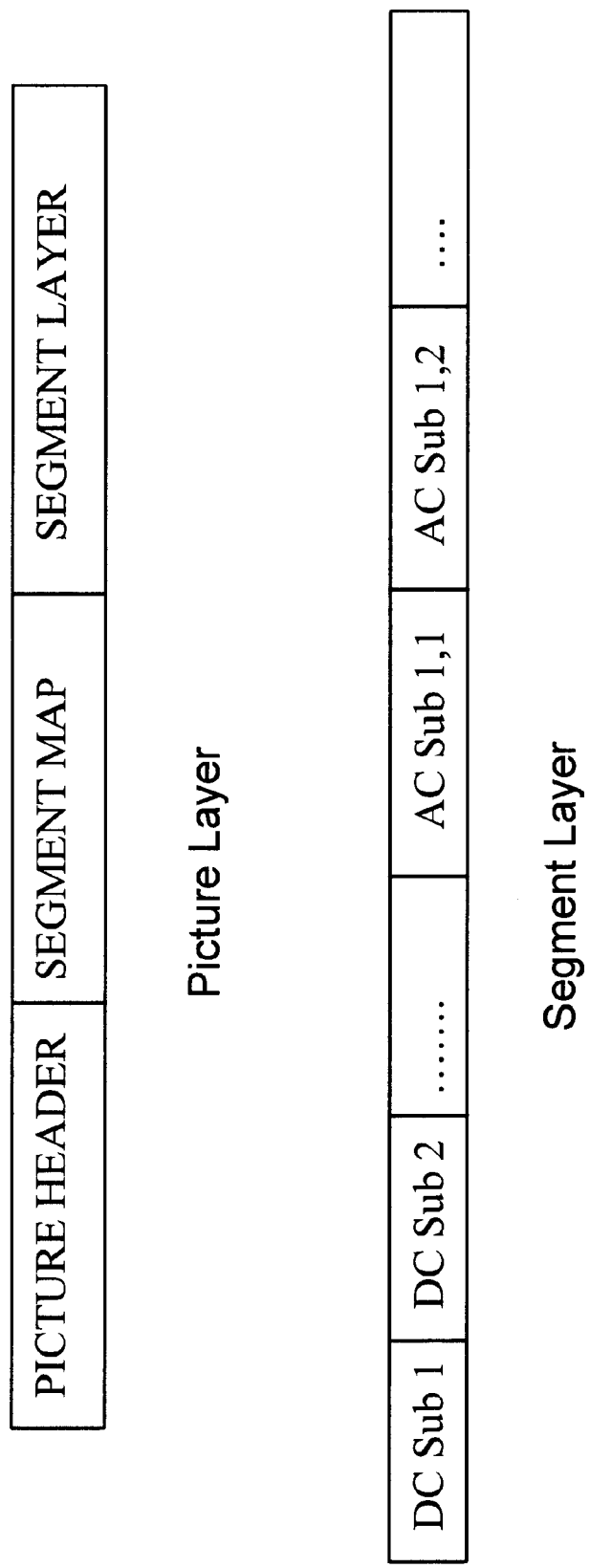
FIG. 9 illustrates a block diagram of a package for use in transmitting the information indicative of the video frame generated in accordance with the method illustrated in FIG. 4.

Turning to FIG. 9, the package that is used to transmit the information indicative of the video image is illustrated. Generally, the package includes a picture header, a segment map, and a segment data layer. The picture header is similar to the picture header utilized in the H.263 video coding standard and contains all information needed to decode one video frame such as a 20-bit start code (PSC), a 5 bit temporal reference (TR) or frame number, and type information (PTYPE). In accordance with this invention, the header also contains a segment identifier (SI) and a bit-field representing the total number of segments (NS) within the picture. As a means to further conserve bandwidth, the segment identifier (SI) was selected to be a four-bit field. Accordingly, as each segment within the segmentation map would be represented by a unique 4 bit segment index, the spatial segmentation methods described above will have to be adapted to ensure that the number of discrete spatial segments that the video frame is divided into does not exceed sixteen. Within the segment map, the first bit is preferably utilized to inform the communication receiver 49VI that the segment map contained within the package is new.

Within the segment data layer, the DC subbands and the AC subbands for each video frame are transmitted in different slices. Preferably the slices are arranged such that the DC subbands first appear in their spatial segmentation transmission priority order followed by the corresponding AC subbands similarly ordered. This structure allows the system to apply unequal error protection (UEP) and transmit the video based on the transmission priority of the segments and the subbands.

Figure 10:
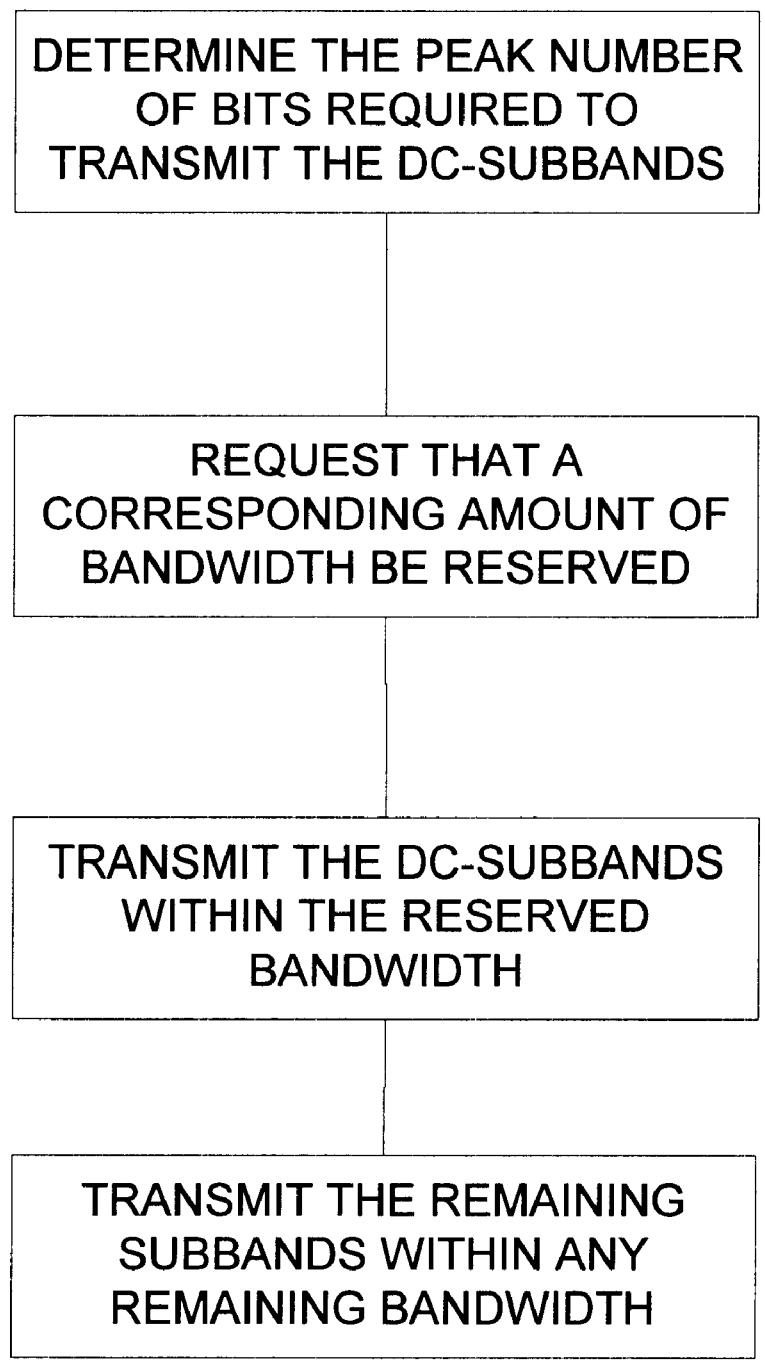
FIG. 10 is a flow chart diagram illustrating a method for reserving bandwidth and subsequently for transmitting the information indicative of the video frame over the communication channel.
Figure 11:
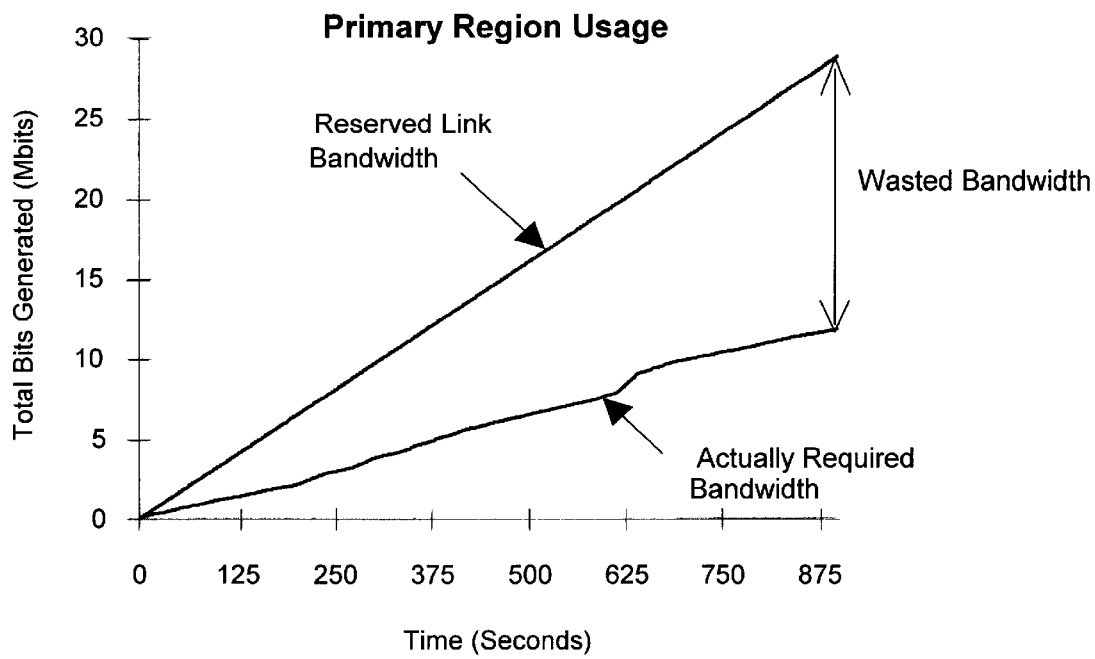
FIG. 11 illustrates two graphs for the purpose of demonstrating bandwidth demand versus bandwidth usage before and after using the method illustrated in FIG. 10.
Figure 11:
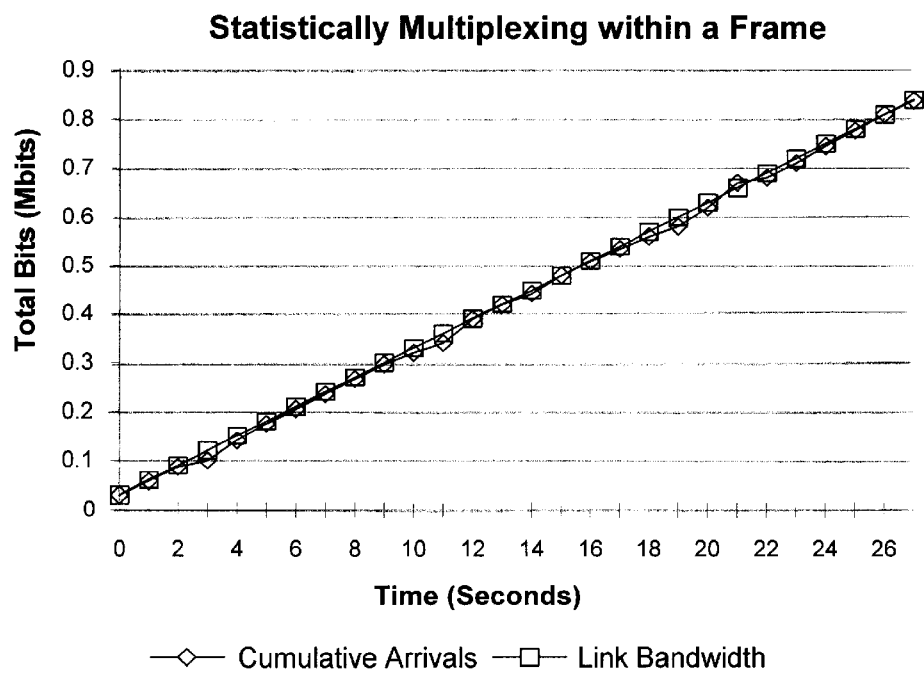

Specifically, the segmentation approach described above facilitates guaranteed quality of service during the transmission of the video information by generally reserving bandwidth as a function of the transmission priority of the subbands of the video segments. Specifically, the number of bits required for transmitting the DC subbands of all the video segments within a video frame is determined. This procedure is repeated for all the video frames within the video sequence that is to be transmitted. Then the maximum (peak) of all these numbers is multiplied by the desired target video frame display rate and the result determines the amount of bandwidth that is to be statically reserved at the connection establishment time. If the reservation is successful, it ensures that there will always be bandwidth available for transmitting at least the DC subbands of all the video frames in the video sequence. This guarantee when combined with the video frame reconstruction procedure, to be described next, guarantees that a minimum video frame temporal resolution can be supported at the receiver. This procedure is illustrated in FIG. 10. As it is likely that most of the time the compressor 164 will produce bits far below this peak number, as illustrated in FIG. 11, the notion of statistical multiplexing within a frame is introduced to avoid under-utilizing the allocated bandwidth. With statistical multiplexing, any bandwidth leftover after the DC subbands have been transmitted is used for transmitting the remaining AC subbands. Also, packets whose retransmission has been requested by a communication receiver 49VI can be sent using the left over bandwidth that was reserved. Furthermore, additional bandwidth can be requested dynamically for the purpose of transmitting any packets that remain after all of the statically allocated bandwidth has been used. In this manner, optimum bandwidth utilization may be achieved.

Figure 12:
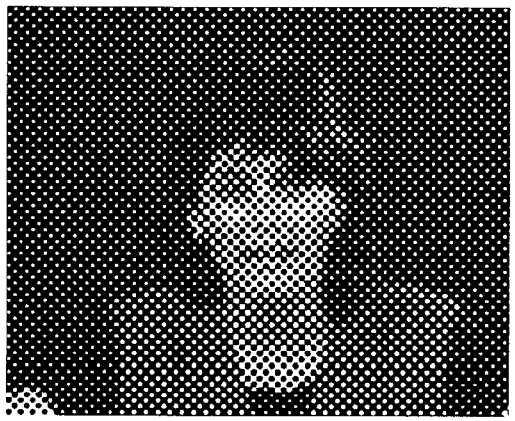
FIG. 12 illustrates the comparative effects of error propagation on a video frame with no segmentation, with spatial segmentation, and with both spatial and frequency segmentation performed according to the method illustrated in FIG. 4.
Figure 12:
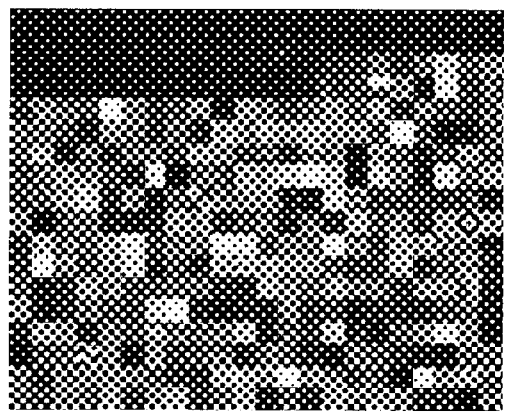
Figure 12:
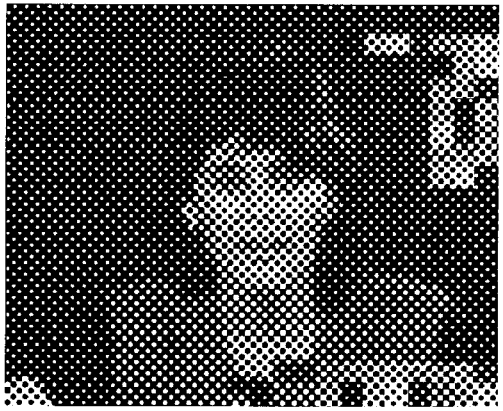
Figure 12:
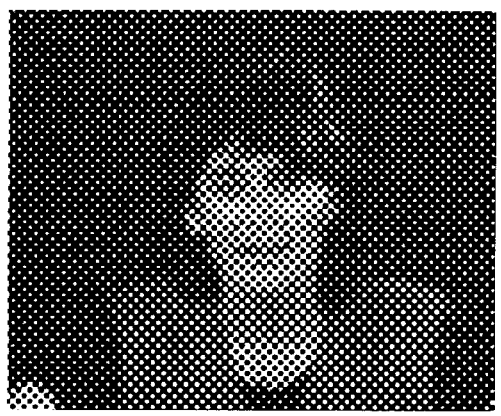
Figure 13:
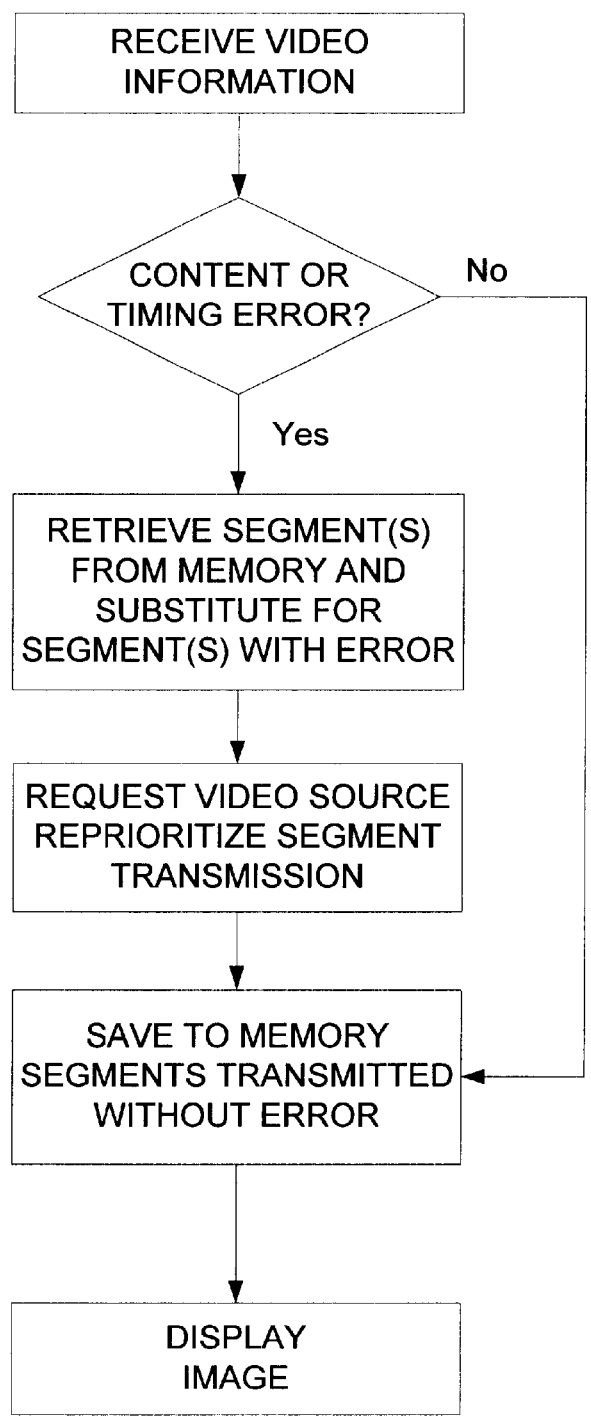
FIG. 13 illustrates a flow chart diagram depicting a method for reconstructing a video frame at the receiver.

At the receiver, transmission errors due to channel imperfections can cause corruption in some of the transmitted video segments rendering them un-decodable. For example, FIG. 12 illustrates error propagation with and without spatial segmentation as a result of a video bit stream that has been corrupted with errors not caught by an error detector. A dynamic reduction in non-reserved bandwidth whereby some of the segments fail to reach the decoder in a timely manner will result in the receiver not being able to reconstruct the complete image. Accordingly, to minimize any errors and be able to create a complete image from incomplete data that may arise if either of these events occur, the receiver employs a frame reconstructing algorithm, illustrated in FIG. 12, that utilizes a combination of the current and previously transmitted video segments that were correctly received.

Specifically, if $S_{ij}$ represents the video segment j in frame i, then if all video segments are received error-free, the complete frame i is formed as:

$$S_i = \Sigma S_{ij} \quad (4)$$

Figure 14:
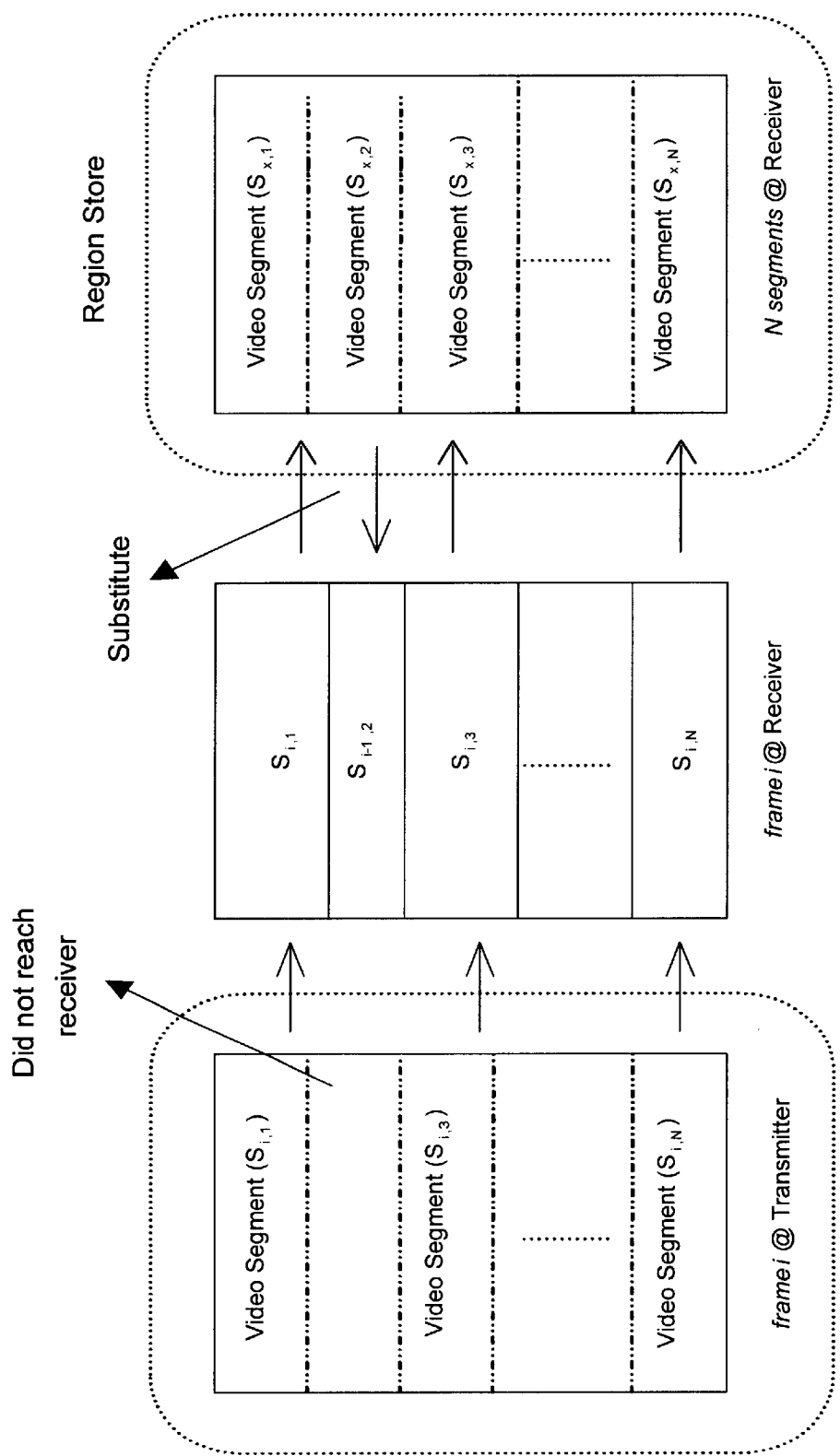
FIG. 14 illustrates the movement of video frame segments when performing the frame reconstruction method illustrated in FIG. 13.

In the case when some of the $S_{ij}$ are incorrectly received, $S_i$ is formed using the last corresponding $j^{th}$ video segment that was received correctly. This methodology of image reconstruction at the receiver is generally illustrated in FIG. 14 for a simple horizontal partitioning scheme.

As will be understood from the foregoing discussion, the video segments stored in the receiver's region store may not belong to the same video frame. Accordingly, when used to reconstruct the video frame in this manner, the temporal differences between the current video segment and the previously correctly received corresponding video segment dictates how good or bad the final picture looks. When this difference is large, visual quality is impaired by the tearing effect. However, when the previous good video segment is from a preceding sequential frame, the quality tends to be visually acceptable. Therefore, to reduce the tearing effect, the communication receiver 49VI may demand from the communication source 20VI the immediate transmission of the video segment(s) that it had to substitute in order to reconstruct the current frame. The communication source 20VI may then switch the transmission priority of the requested segment(s) to ensure that the requested video segment(s) definitely reach the communication receiver 20VI. With such a scheme, the difference between the current video segment and the ones stored in the receiver's region store is never too much and the tearing effect is mitigated.

From the foregoing descriptions, it will be appreciated that the invention described herein provides a solution to the problem of guaranteeing a temporal and spatial video frame resolution at the receiver for time-bounded video transmitted over a communication channel. In particular, this is achieved by using a channel sensitive video encoder, determining the appropriate amount of channel bandwidth to reserve, utilizing the reserved bandwidth without wastage, and developing a error-concealment mechanism for reconstructing the video frame from incomplete data or data received in error, without the need for re-transmissions.

In view of the many possible embodiments to which the principles of this invention may be applied, it should be recognized that the embodiments described herein with respect to the drawing FIGS. is meant to be illustrative only and should not be taken as limiting the scope of invention. For example, those skilled in the art will recognize that the elements of the illustrated embodiments described in software and algorithmic form may be implemented in hardware and vice versa or that the illustrated embodiments can be modified in arrangement and detail without departing from the spirit of the invention. Therefore, the invention as described herein contemplates all such embodiments as may come within the scope of the following claims and equivalents thereof.

What is claimed is:

1. A method of requesting bandwidth in a communications channel for use in transmitting a plurality of video frames in a video segment to a receiver, comprising the steps of:

spatially segmenting each video frame in the video segment;

determining the number of bits required to transmit a predefined subset of each spatially segmented video frame;

with respect to all of the plurality of video frames, determining the maximum number of bits required to transmit the predefined subset of any video frame of the plurality of video frames; and statically requesting an amount of bandwidth from the communications channel for the transmission of all of the plurality of frames as a function of the maximum number of bits required to transmit any frame of the plurality of frames whereby a minimum spatial and temporal resolution is guaranteed at the receiver.

2. The method as recited in claim 1 wherein the step of statically requesting an amount of bandwidth comprises the further steps of multiplying the maximum number of bits required to transmit the predefined subset of any video frame of the plurality of video frames by a desired target video frame display rate and using the result to statically request the amount of bandwidth at a time of connection.

3. The method as recited in claim 2 further comprising the step of compressing each segment generated by the step of spatially segmenting before the step of determining the number of bits required to transmit a predefined subset of each spatially segmented video frame.

4. A computer-readable medium for requesting bandwidth in a communications channel for use in transmitting a plurality of video frames in a video segment to a receiver, the computer-readable medium having instructions for performing the steps of:

spatially segmenting each video frame in the video segment;

determining the number of bits required to transmit a predefined subset of each spatially segmented video frame;

with respect to all of the plurality of video frames, determining the maximum number of bits required to transmit the predefined subset of any video frame of the plurality of video frames; and statically requesting an amount of bandwidth in the communications channel for the transmission of all of the plurality of frames as a function of the maximum number of bits required to transmit any frame of the plurality of frames whereby a minimum spatial and temporal resolution is guaranteed at the receiver.

5. The computer-readable medium as recited in claim 4 wherein the instructions for performing the step of statically requesting an amount of bandwidth perform the further steps of multiplying the maximum number of bits required to transmit the predefined subset of any video frame of the plurality of video frames by a desired target video frame display rate and using the result to statically request the amount of bandwidth at a time of connection.

6. The computer-readable medium as recited in claim 5 further comprising instructions for performing the step of compressing each segment generated by the step of spatially segmenting before the step of determining the number of bits required to transmit a predefined subset of each spatially segmented video frame.

7. A method for improving the efficiency of a video transmission comprised of a plurality of video frames over a channel in a communications network comprised of a plurality of channel frames, the method comprising the steps of:

segmenting each video frame of the plurality of video frames into a plurality of discrete digitally represented components;

determining the number of bits required to transmit a predefined subset of the discrete digitally represented components of each video frame of the plurality of video frames;

with respect to all of the plurality of video frames, determining the greatest number of bits required to transmit the predefined subset of the discrete digitally represented components of any video frame of the plurality of video frames;

requesting from the channel an amount of bandwidth as a function of the greatest number of bits required to transmit the predefined subset of the discrete digitally represented components of any video frame of the plurality of video frames;

transmitting within the requested bandwidth in each channel frame of the plurality of channel frames the predefined subset of the discrete digitally represented components of sequential ones of the plurality of video frames; and using any left over bandwidth in each channel frame of the plurality of channel frames to transmit any remaining discrete digitally represented components of the corresponding one of the plurality of video frames.

8. A computer-readable medium for use in improving the efficiency of a video transmission comprised of a plurality of video frames over a channel in a communications network comprised of a plurality of channel frames, the computer-readable medium having instructions for performing the steps of:

segmenting each video frame of the plurality of video frames into a plurality of discrete digitally represented components;

determining the number of bits required to transmit a predefined subset of the discrete digitally represented components of each video frame of the plurality of video frames;

with respect to all of the plurality of video frames, determining the greatest number of bits required to transmit the predefined subset of the discrete digitally represented components of any video frame of the plurality of video frames;

requesting from the channel an amount of bandwidth as a function of the greatest number of bits required to transmit the predefined subset of the discrete digitally represented components of any video frame of the plurality of video frames;

transmitting within the requested bandwidth in each channel frame of the plurality of channel frames the predefined subset of the discrete digitally represented components of sequential ones of the plurality of video frames; and using any left over bandwidth in each channel frame of the plurality of channel frames to transmit any remaining discrete digitally represented components of the corresponding one of the plurality of video frames.

9. A method of requesting bandwidth in a communications channel for use in transmitting a plurality of video frames in a video segment to a receiver, comprising:

spatially segmenting each video frame in the video segment;

determining the number of bits required to transmit a predefined subset of each spatially segmented video frame;

with respect to all of the plurality of video frames, determining the maximum number of bits required to transmit the predefined subset of any video frame of the plurality of video frames; and statically requesting an amount of bandwidth from the communications channel for the transmission of all of the plurality of frames as a function of the maximum number of bits required to transmit any frame of the plurality of frames whereby a minimum spatial and temporal resolution is guaranteed at the receiver.

10. A method for improving the efficiency of a video transmission comprised of a plurality of video frames over a channel in a communications network comprised of a plurality of channel frames, the method comprising:

segmenting each video frame of the plurality of video frames into a plurality of discrete digitally represented components;

determining the number of bits required to transmit a predefined subset of the discrete digitally represented components of each video frame of the plurality of video frames;

with respect to all of the plurality of video frames, determining the greatest number of bits required to transmit the predefined subset of the discrete digitally represented components of any video frame of the plurality of video frames;

requesting from the channel an amount of bandwidth as a function of the greatest number of bits required to transmit the predefined subset of the discrete digitally represented components of any video frame of the plurality of video frames;

transmitting within the requested bandwidth in each channel frame of the plurality of channel frames the predefined subset of the discrete digitally represented components of sequential ones of the plurality of video frames; and using any left over bandwidth in each channel frame of the plurality of channel frames to transmit any remaining discrete digitally represented components of the corresponding one of the plurality of video frames.

11. A method of obtaining the use of communication capacity in a communications channel for transmitting a video sequence comprising a plurality of visual images to a receiver, comprising:

decomposing each visual image in the video sequence into a plurality of component parts;

associating each visual image in the sequence with an amount of data required to transmit a predetermined portion of the component parts of the visual image;

identifying a maximum amount of data required to transmit the predetermined portion of component parts of any image; and obtaining the use of communication capacity in the communications channel for the transmission of the video sequence based on the identified maximum amount of data required to transmit the predetermined portion of component parts of any image.

12. The method according to claim 11 wherein obtaining the use of communication capacity in the communications channel further comprises multiplying the identified maximum amount of data required to transmit the predetermined portion of component parts of any image by a target frame rate.

13. The method according to claim 12 further comprising coding each component part generated by the step of decomposing each visual image prior to identifying a maximum amount of data required to transmit the predetermined portion of component parts of any image.

14. The method according to claim 11, wherein decomposing each visual image in the video sequence into a plurality of component parts comprises decomposing each visual image into a plurality of different frequency components.

15. The method according to claim 14, wherein the plurality of different frequency components comprise a DC frequency component and a plurality of AC frequency components.

16. The method according to claim 11, wherein decomposing each visual image in the video sequence into a plurality of component parts comprises decomposing each visual image into a plurality of spatial components.

17. A method for improving the efficiency of use of a communication transmission path during transmission of a video series comprising a plurality of images, the method comprising:

segmenting each image of the plurality of images into a plurality of discrete digitally represented components;

determining a number of bits required to transmit a predefined subset of the discrete digitally represented components of each image;

identifying a maximum bit requirement corresponding to the number of bits required to transmit the predefined subset of the discrete digitally represented components of a particular image of the plurality of images requiring a greater number of bits for transmission of its predefined subset of components than any other of the plurality of images;

obtaining authorization to utilize an authorized amount of bandwidth in the communication transmission path, wherein the authorized amount of bandwidth is selected as a fiction of the maximum bit requirement;

transmitting within the authorized amount of bandwidth the predefined subset of the discrete digitally represented components of each image in the video series; and if a utilized amount of bandwidth consumed to transmit the predefined subset of the discrete digitally represented components of each image in the video series is less than the authorized amount of bandwidth, using the difference in bandwidth between the authorized amount of bandwidth and the utilized amount of bandwidth to transmit at least one remaining discrete digitally represented component of at least one of the plurality of images.

18. A method of securing the use of bandwidth for transmitting at least a portion of each of a plurality of pictures in a video segment to a receiver, comprising:

segmenting each picture in the video segment into a plurality of separate frequency elements;

determining a picture requirement number of bits associated with each picture, wherein each picture requirement number of bits corresponds to a number of bits required to transmit a predefined portion of its associated segmented picture;

identifying the highest picture requirement from among the picture requirements for all pictures in the video segment; and securing a guaranteed amount of bandwidth from a communications channel for the sequential transmission of at least the predefined portion of each segmented picture of the plurality of pictures over the communications channel, wherein the guaranteed amount of bandwidth is chosen as a function of the identified highest picture requirement.

19. The method according to claim 18, wherein securing a guaranteed amount of bandwidth further comprises multiplying the identified highest picture requirement by a target video rate.

20. The method according to claim 18, further comprising encoding at least one frequency element associated with each segmented picture before identifying the highest picture requirement from among the picture requirements for all pictures in the video segment.

* * * * *

UNITED STATES PATENT AND TRADEMARK OFFICE
CERTIFICATE OF CORRECTION

PATENT NO. : 6,519,004 B1
DATED : February 11, 2003
INVENTOR(S) : Paramvir Bahl

It is certified that error appears in the above-identified patent and that said Letters Patent is hereby corrected as shown below:

Column 1,
Lines 21 and 27, "Sharon's" should read -- Shannon's --.

Column 5,
Lines 65 and 66, the title of the invention should be enclosed in quotation marks.

Column 6,
Line 44, "bosing" should read -- basing --.

Column 11,
Line 15, "FIGS." should read -- figures --.

Signed and Sealed this

Fifteenth Day of July, 2003

JAMES E. ROGAN
*Director of the United States Patent and Trademark Office*